(12) United States Patent
Popov

(10) Patent No.: US 11,370,528 B2
(45) Date of Patent: Jun. 28, 2022

(54) VARIABLE CAMBER TRIM UNITS, AIRCRAFT COMPRISING THE SAME, AND ASSOCIATED METHODS OF OPERATION

(71) Applicant: The Boeing Company, Chicago, IL (US)

(72) Inventor: Maxim Popov, Zhukovsky (RU)

(73) Assignee: THE BOEING COMPANY, Chicago, IL (US)

( * ) Notice: Subject to any disclaimer, the term of this patent is extended or adjusted under 35 U.S.C. 154(b) by 123 days.

(21) Appl. No.: 16/895,260

(22) Filed: Jun. 8, 2020

(65) Prior Publication Data

US 2021/0380226 A1    Dec. 9, 2021

(51) Int. Cl.
   *B64C 13/34*      (2006.01)
   *B64C 3/50*       (2006.01)
   *B64C 9/00*       (2006.01)
   *B64C 13/40*      (2006.01)

(52) U.S. Cl.
   CPC ........... *B64C 13/34* (2013.01); *B64C 3/50* (2013.01); *B64C 9/00* (2013.01); *B64C 13/40* (2013.01)

(58) Field of Classification Search
   CPC ......... B64C 13/34; B64C 13/40; B64C 13/36; B64C 3/50; B64C 9/00
   See application file for complete search history.

(56) References Cited

U.S. PATENT DOCUMENTS

| | | | |
|---|---|---|---|
| 9,193,440 B2 | 11/2015 | Moser et al. | |
| 2006/0049308 A1* | 3/2006 | Good | B64C 13/26 244/76 A |
| 2021/0039770 A1* | 2/2021 | Thomas | B64C 9/02 |
| 2021/0380225 A1* | 12/2021 | Popov | B64C 3/50 |

* cited by examiner

*Primary Examiner* — Rodney A Bonnette
(74) *Attorney, Agent, or Firm* — Dascenzo Gates Intellectual Property Law, P.C.

(57) ABSTRACT

A variable camber trim unit comprises a housing, an input gear, and an output gear. The input gear and the output gear are rotatably supported by the housing. The variable camber trim unit is selectively configurable to one of a coupled configuration or a decoupled configuration. When the variable camber trim unit is in the coupled configuration, rotation of the input gear relative to the housing causes rotation of the output gear relative to the housing. When the variable camber trim unit is in the decoupled configuration, rotation of the input gear relative to the housing does not cause rotation of the output gear relative to the housing, and the output gear is capable of at least 5° and no more than 15° of rotation relative to the housing.

21 Claims, 11 Drawing Sheets

VARIABLE CAMBER TRIM UNITS, AIRCRAFT COMPRISING THE SAME, AND ASSOCIATED METHODS OF OPERATION

FIELD

The present disclosure relates to flight-control surfaces of aircraft.

BACKGROUND

Variable camber flap systems of aircraft require the ability to actuate inboard and outboard flaps separately. In conventional systems, the inboard and outboard shafts of a variable camber trim unit are connected to each other by a clutch, comprising a set of friction disks, preloaded by a disk spring stack. These existing units are large, heavy, complex, and may result in differential rotation between the input shaft and the output shaft due to slippage of the clutch.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a variable camber trim unit that comprises a housing, an input gear, and an output gear. The input gear and the output gear are rotatably supported by the housing. The variable camber trim unit is selectively configurable to one of a coupled configuration or a decoupled configuration. When the variable camber trim unit is in the coupled configuration, rotation of the input gear relative to the housing causes rotation of the output gear relative to the housing. When the variable camber trim unit is in the decoupled configuration, rotation of the input gear relative to the housing does not cause rotation of the output gear relative to the housing, and the output gear is capable of at least 5° and no more than 15° of rotation relative to the housing.

The housing provides structure for rotatably supporting the input gear, the output gear, and other structures of the variable camber trim unit of examples disclosed herein. When the input gear is coupled to an upstream structure for inputting a rotational input to the variable camber trim unit, the input gear transfers the rotational input to a downstream structure via the output gear when the variable camber trim unit is in the coupled configuration. By having a coupled configuration and a decoupled configuration, the variable camber trim unit provides for selective coupling and decoupling of rotational movement of structures coupled to the input gear and the output gear. Moreover, not only is the output gear rotationally decoupled from the input gear when the variable camber trim unit is in the decoupled configuration, but also the output gear is capable of minimal rotation relative to the housing, which is desirable in some configurations of flight-control surfaces with which the variable camber trim unit is used in one or more examples.

Also disclosed herein is a method of trimming flight-control surfaces. The method comprises configuring a variable camber trim unit to a coupled configuration and configuring the variable camber trim unit to a decoupled configuration. The variable camber trim unit comprises a housing, an input gear, and an output gear. The input gear and the output gear are rotatably supported by the housing. When the variable camber trim unit is in the coupled configuration, rotation of the input gear relative to the housing causes rotation of the output gear relative to the housing. When the variable camber trim unit is in the decoupled configuration, rotation of the input gear relative to the housing does not cause rotation of the output gear relative to the housing, and the output gear is capable of at least 5° and no more than 15° of rotation relative to the housing.

By having a coupled configuration and a decoupled configuration, the variable camber trim unit provides for selective coupling and decoupling of rotational movement of structures coupled to the input gear and the output gear. Moreover, not only is the output gear rotationally decoupled from the input gear when the variable camber trim unit is in the decoupled configuration, but also the output gear is capable of minimal rotation relative to the housing, which is desirable in some configurations of flight-control surfaces with which the variable camber trim unit is used in one or more examples.

Also disclosed herein is an aircraft that comprises a fuselage and a wing, supported by the fuselage. The wing comprises an inboard flight-control surface, an outboard flight-control surface, and a variable camber trim unit. The inboard flight-control surface and the outboard flight-control surface are movable relative to the fuselage. The variable camber trim unit is selectively configurable to one of a coupled configuration or a decoupled configuration. When the variable camber trim unit is in the coupled configuration, the outboard flight-control surface is coupled to the inboard flight-control surface, such that when the inboard flight-control surface is moved relative to the fuselage, the outboard flight-control surface also is moved relative to the fuselage. When the variable camber trim unit is in the decoupled configuration, the outboard flight-control surface is decoupled from the inboard flight-control surface, such that moving the inboard flight-control surface relative to the fuselage does not cause the outboard flight-control surface to move relative to the fuselage.

By having a coupled configuration and a decoupled configuration, the variable camber trim unit provides for selective coupling and decoupling of the inboard flight-control surface and the outboard flight-control surface.

Also disclosed herein is a method of operating an aircraft. The method comprises configuring a variable camber trim unit of the aircraft to a coupled configuration and configuring the variable camber trim unit to a decoupled configuration.

By having a coupled configuration and a decoupled configuration, the variable camber trim unit provides for selective coupling and decoupling of the inboard flight-control surface and the outboard flight-control surface.

BRIEF DESCRIPTION OF THE DRAWINGS

Reference will now be made to the accompanying drawings, which are not necessarily drawn to scale, and where like reference characters designate the same or similar parts throughout the several views. In the drawings.

DESCRIPTION

Figure 1:
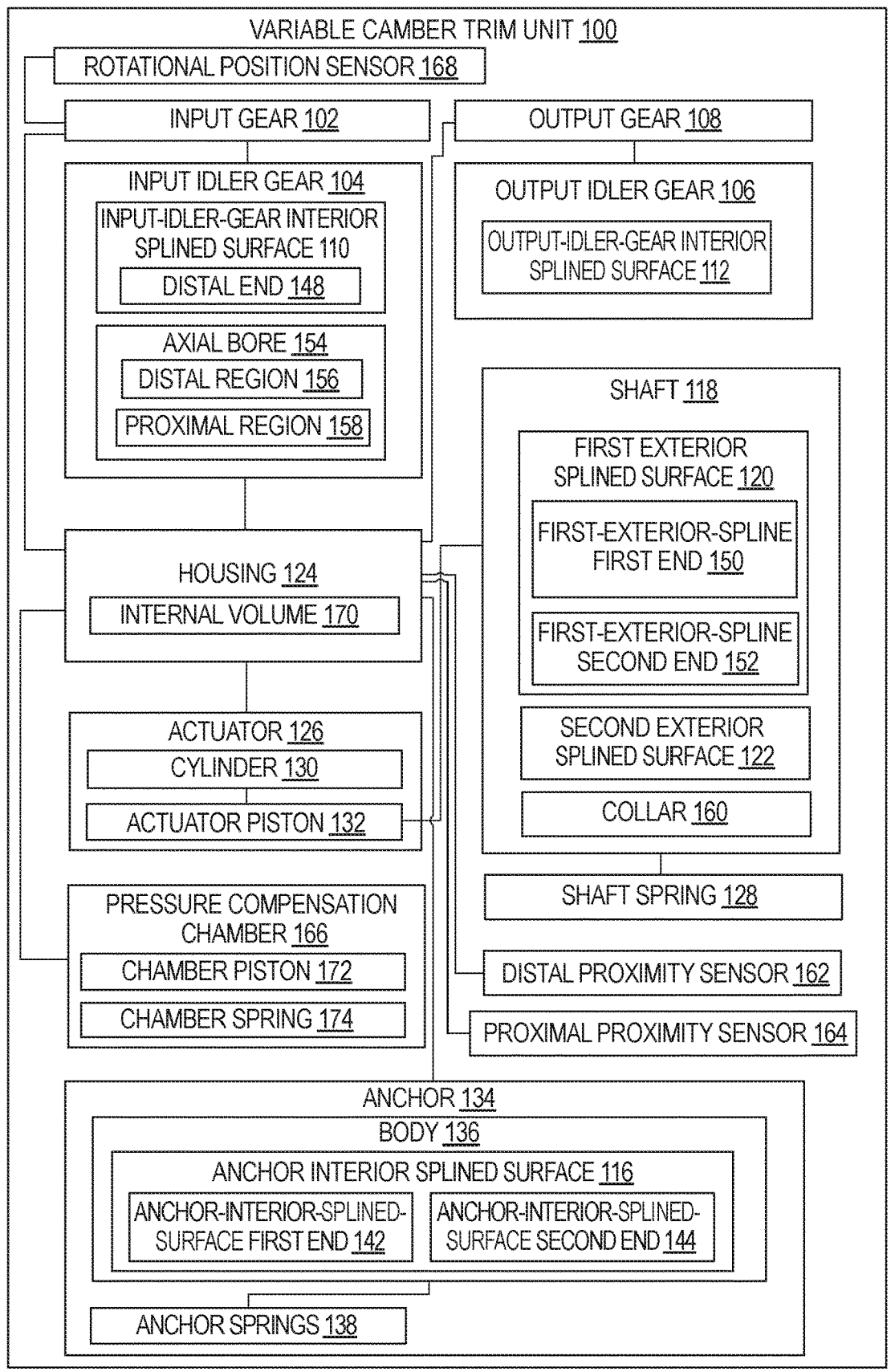
FIG. 1 is a block diagram of a variable camber trim unit, according to one or more examples of the subject matter, disclosed herein.
Figure 8:
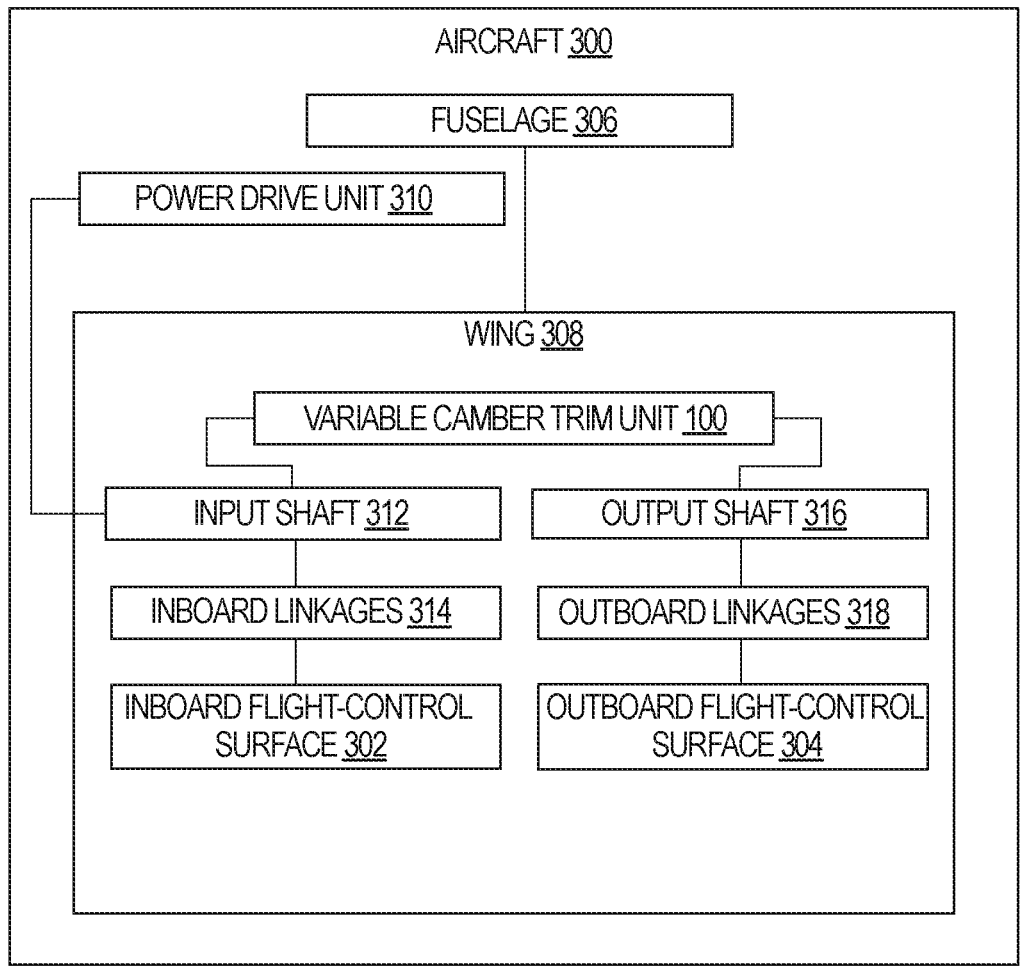
FIG. 8 is a block diagram of an aircraft comprising the variable camber trim unit of FIG. 1, according to one or more examples of the subject matter, disclosed herein.

In FIGS. 1 and 8, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1 and 8 may be combined in various ways without the need to include other features described in FIGS. 1 and 8, other drawing figures, and/or the accompanying disclosure, even though such combination or combinations are not explicitly illustrated herein. Similarly, additional features, not limited to the examples presented, may be combined with some or all of the features shown and described herein.

Figure 7:
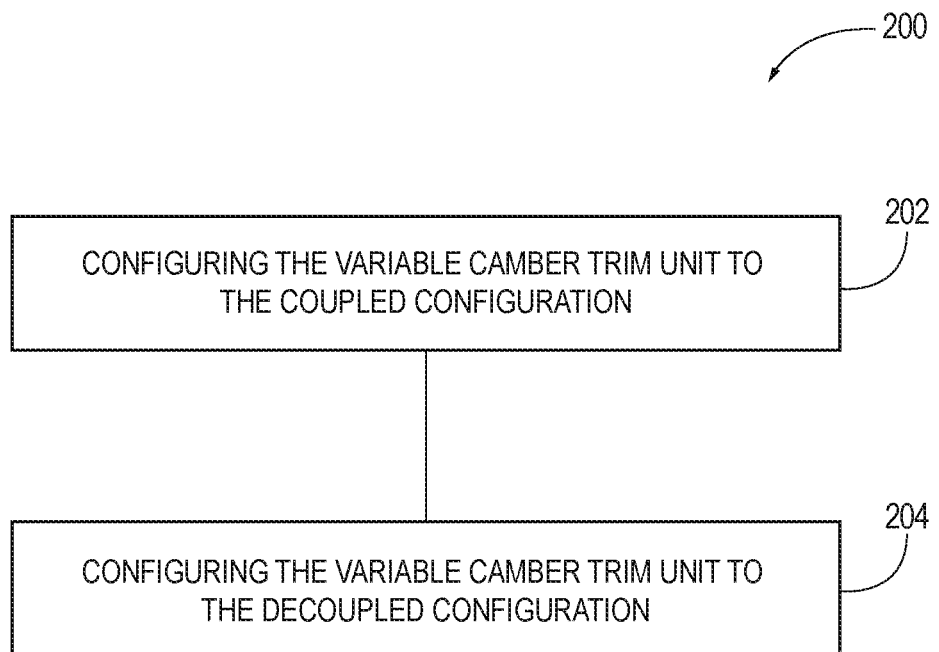
FIG. 7 is a block diagram of a method of trimming flight-control surfaces, using the variable camber trim unit of FIG. 1, according to one or more examples of the subject matter, disclosed herein.
Figure 10:
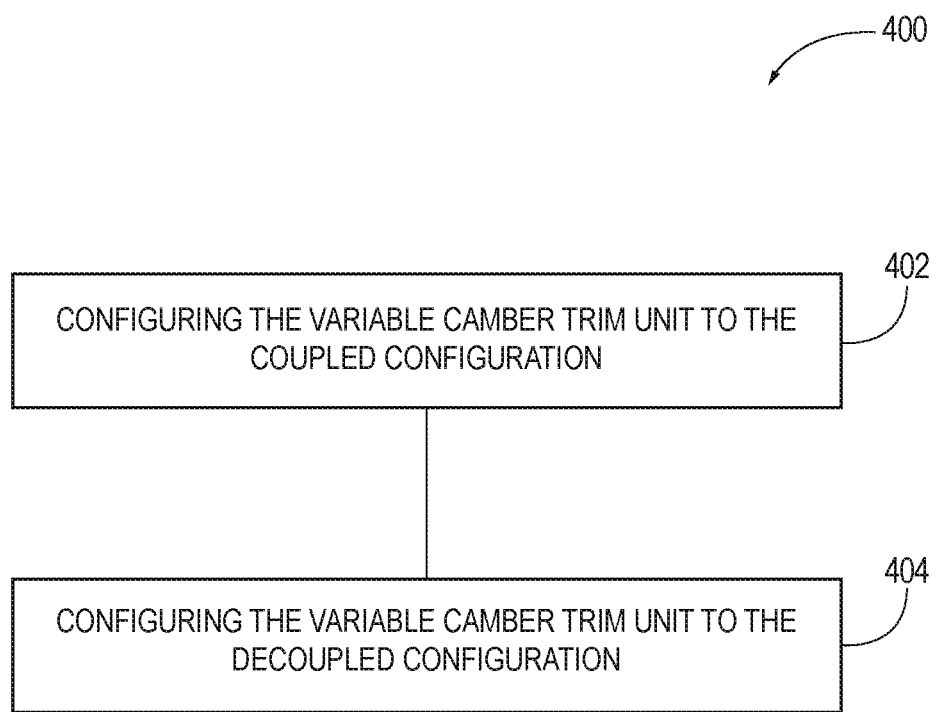
FIG. 10 is a block diagram of a method of operating the aircraft of FIG. 9, according to one or more examples of the subject matter, disclosed herein.
Figure 11:
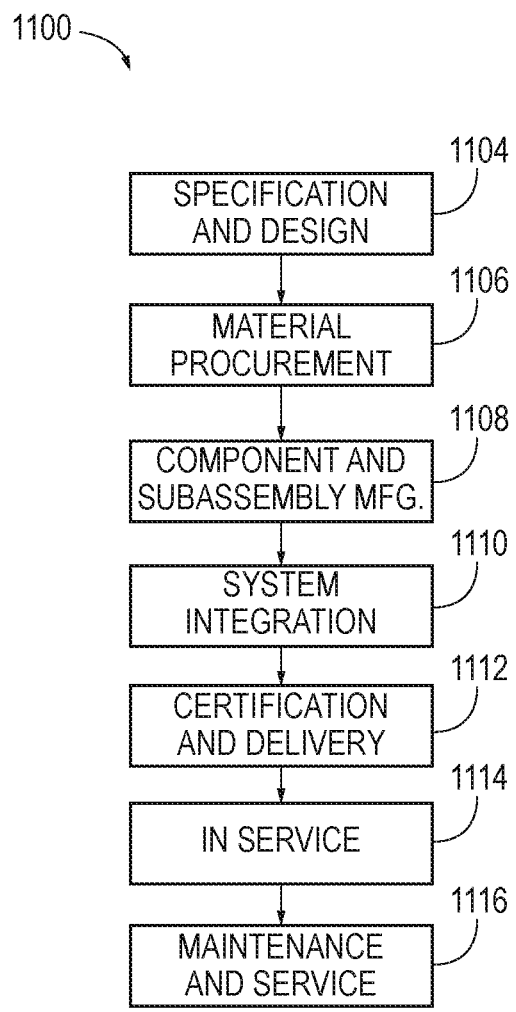
FIG. 11 is a block diagram of aircraft production and service methodology.

In FIGS. 7, 10, and 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7, 10, and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Figure 2:
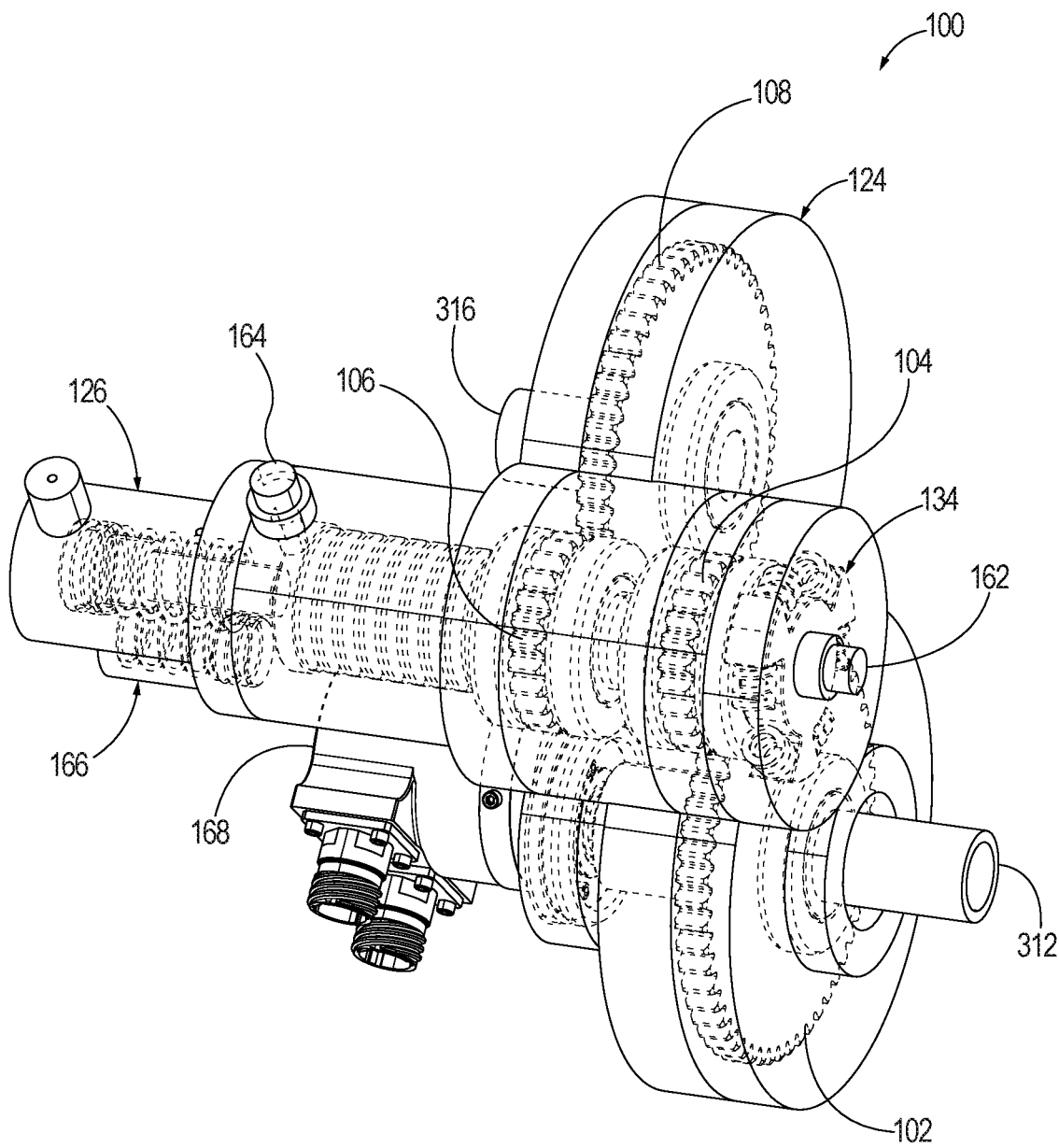
FIG. 2 is a schematic, isometric view of the variable camber trim unit of FIG. 1, according to one or more examples of the subject matter, disclosed herein, with the variable camber trim unit shown in the coupled configuration.
Figure 3:
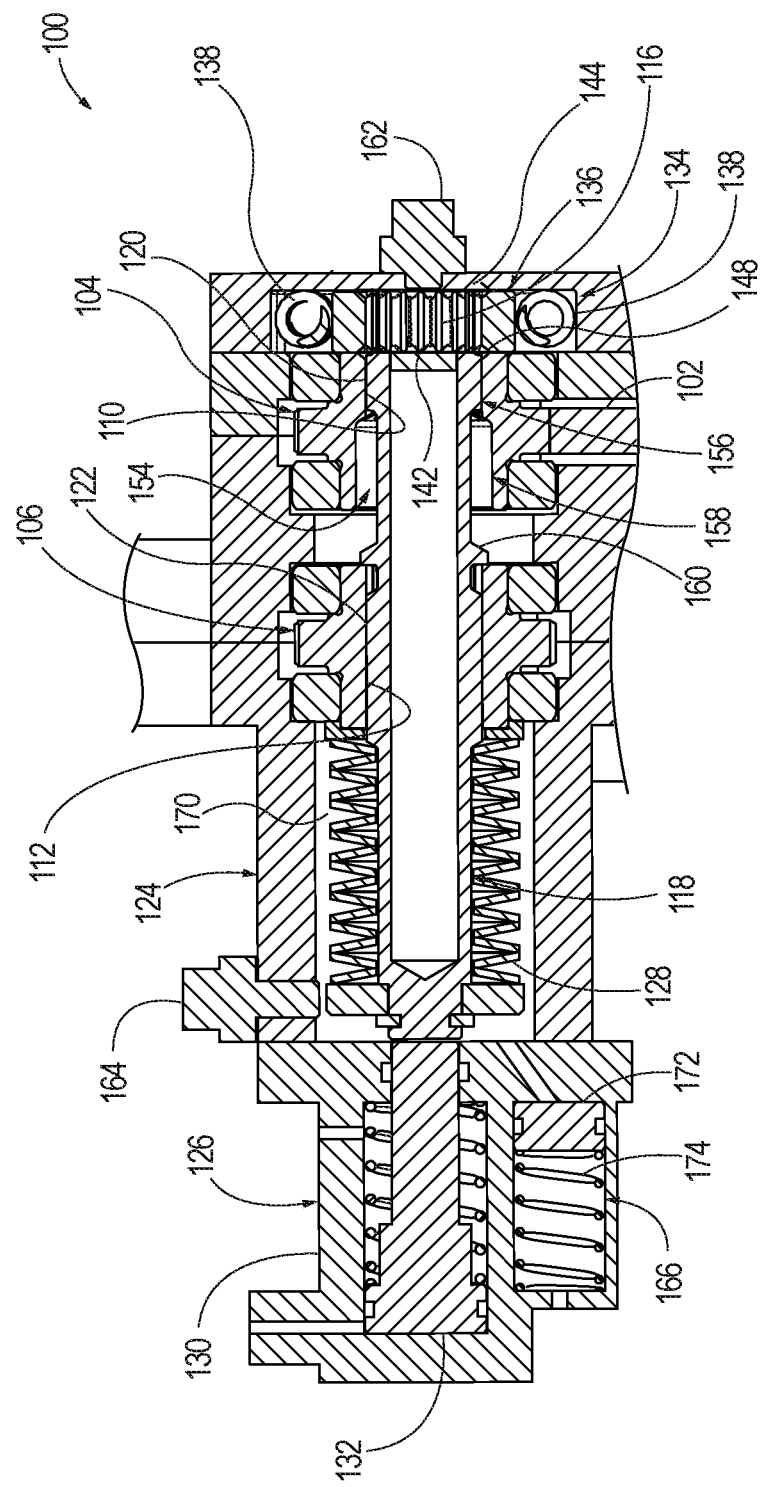
FIG. 3 is a schematic, fragmentary, cross-sectional, side view of the variable camber trim unit of FIG. 1, according to one or more examples of the subject matter, disclosed herein, with the variable camber trim unit shown in the coupled configuration.
Figure 4:
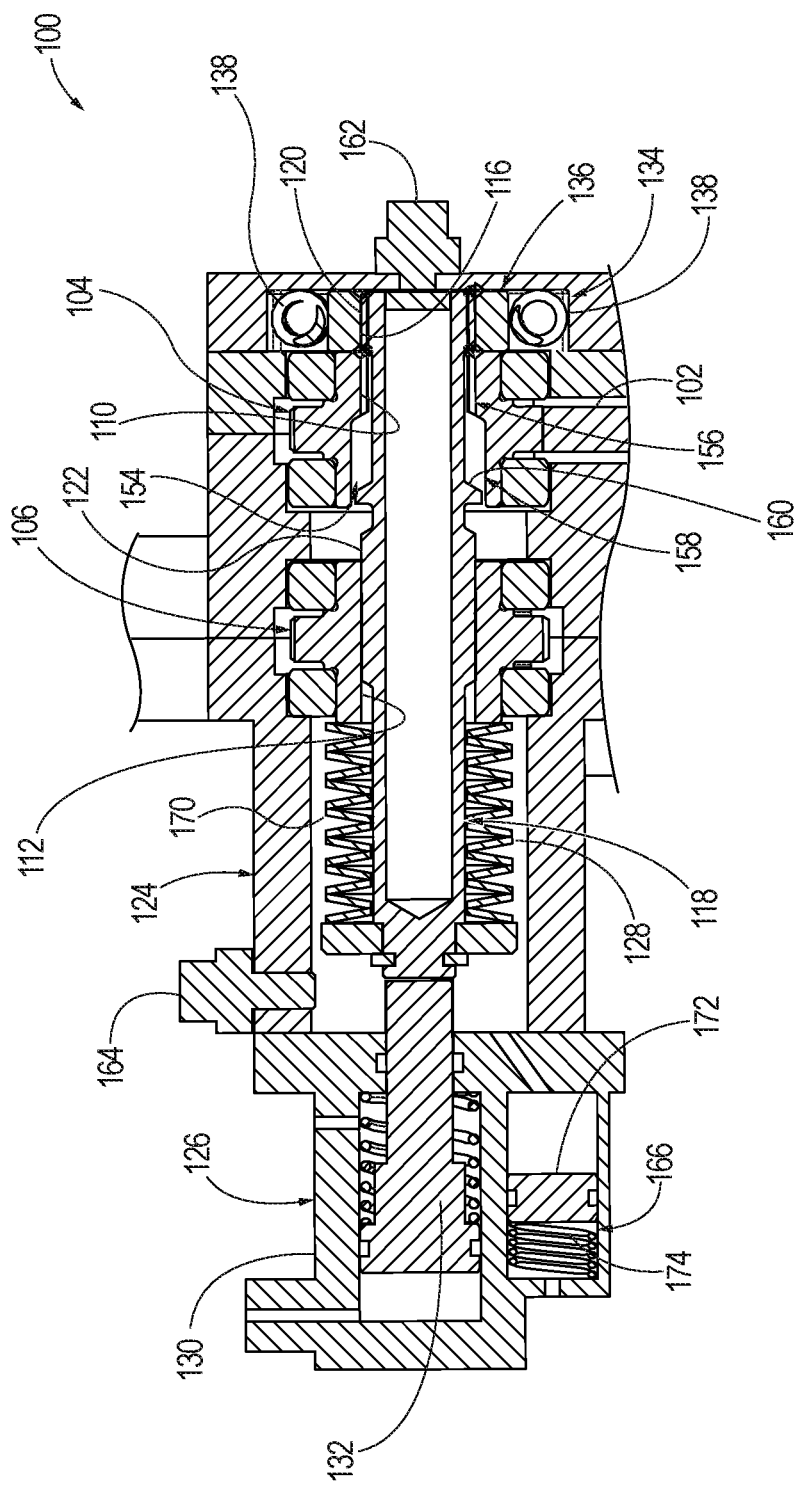
FIG. 4 is a schematic, fragmentary, cross-sectional, side view of the variable camber trim unit of FIG. 1, according to one or more examples of the subject matter, disclosed herein, with the variable camber trim unit shown in the decoupled configuration.

Referring generally to FIG. 1 and particularly to, e.g., FIGS. 2-4 for illustrative purposes only and not by way of limitation, variable camber trim unit 100 comprises housing 124, input gear 102, and output gear 108. Input gear 102 and output gear 108 are rotatably supported by housing 124. Variable camber trim unit 100 is selectively configurable to one of a coupled configuration or a decoupled configuration. When variable camber trim unit 100 is in the coupled configuration, rotation of input gear 102 relative to housing 124 causes rotation of output gear 108 relative to housing 124. When variable camber trim unit 100 is in the decoupled configuration, rotation of input gear 102 relative to housing 124 does not cause rotation of output gear 108 relative to housing 124, and output gear 108 is capable of at least 5° and no more than 15° of rotation relative to housing 124. The preceding portion of this paragraph characterizes example 1 of the subject matter, disclosed herein.

Housing 124 provides structure for rotatably supporting input gear 102, output gear 108, and other structures of variable camber trim unit 100 of examples disclosed herein. When input gear 102 is coupled to an upstream structure for inputting a rotational input to variable camber trim unit 100, input gear 102 transfers the rotational input to a downstream structure via output gear 108 when variable camber trim unit 100 is in the coupled configuration. By having a coupled configuration and a decoupled configuration, variable camber trim unit 100 provides for selective coupling and decoupling of rotational movement of structures coupled to input gear 102 and output gear 108. Moreover, not only is output gear 108 rotationally decoupled from input gear 102 when variable camber trim unit 100 is in the decoupled configuration, but also output gear 108 is capable of minimal rotation relative to housing 124, which is desirable in some configurations of flight-control surfaces with which variable camber trim unit 100 is used in one or more examples.

Referring generally to FIG. 1 and particularly to, e.g., FIGS. 3 and 4 for illustrative purposes only and not by way of limitation, variable camber trim unit 100 further comprises input idler gear 104, output idler gear 106, shaft 118, and anchor 134. Input idler gear 104 is rotatably supported by housing 124, is meshed with input gear 102, and comprises input-idler-gear interior splined surface 110. Output idler gear 106 is rotatably supported by housing 124, is coaxial with input idler gear 104, is meshed with output gear 108, and comprises output-idler-gear interior splined surface 112. Shaft 118 is translationally supported within housing 124, is coaxial with input idler gear 104 and with output idler gear 106, and comprises first exterior splined surface 120, having first-exterior-splined-surface maximum diameter, and second exterior splined surface 122, having second-exterior-splined-surface maximum diameter. Anchor 134 is positioned within housing 124 and comprises anchor interior splined surface 116, which is coaxial with input idler gear 104 and with output idler gear 106. When variable camber trim unit 100 is in the coupled configuration, shaft 118 is positioned within housing 124, such that first exterior splined surface 120 of shaft 118 is engaged with input-idler-gear interior splined surface 110, first exterior splined surface 120 of shaft 118 is disengaged from anchor interior splined surface 116, and second exterior splined surface 122 of shaft 118 is engaged with output-idler-gear interior splined surface 112. When variable camber trim unit 100 is in the decoupled configuration, shaft 118 is positioned within housing 124, such that first exterior splined surface 120 of shaft 118 is disengaged from input-idler-gear interior splined surface 110, first exterior splined surface 120 of shaft 118 is engaged with anchor interior splined surface 116, and second exterior splined surface 122 of shaft 118 is engaged with output-idler-gear interior splined surface 112. The preceding portion of this paragraph characterizes example 2 of the subject matter, disclosed herein, wherein example 2 also encompasses example 1, above.

Input idler gear 104 and output idler gear 106 provide structure for transferring rotational input from input gear 102 to output gear 108, via shaft 118, when variable camber trim unit is in the coupled configuration. Shaft 118, via its exterior splines and their engagement with the interior splines of input idler gear 104, output idler gear 106, and anchor 134 and via its translation within housing 124 enables the coupled and decoupled configurations of variable camber trim unit 100.

In one or more examples, input idler gear 104 and output idler gear 106 are pinion gears. The various splined surfaces, disclosed herein, take any suitable form and configuration for operative engagement with a corresponding splined surface. In one or more examples, each splined surface comprises a plurality of splines that are sized and shaped to selectively slide into engagement with a corresponding plurality of splines such that when two splined surfaces are operatively engaged, the two splined surfaces are coupled together and restricted from relative movement with respect to each other. Splines additionally or alternatively are described as elongate teeth or ridges.

Referring generally to FIG. 1 and particularly to, e.g., FIGS. 2-4 for illustrative purposes only and not by way of limitation, variable camber trim unit 100 further comprises actuator 126, supported by housing 124 and configured to selectively translate shaft 118 from a retracted position, in which first exterior splined surface 120 is disengaged from anchor interior splined surface 116, to an extended position, in which first exterior splined surface 120 is engaged with anchor interior splined surface 116. The preceding portion of this paragraph characterizes example 3 of the subject matter, disclosed herein, wherein example 3 also encompasses example 2, above.

By including actuator 126, variable camber trim unit 100 is controllable to transition variable camber trim unit 100 to its decoupled configuration when desired by a user or otherwise responsive to input from a control system, such as a flight control system.

In one or more examples, actuator 126 is a hydraulic actuator and is tied to a hydraulic system of an aircraft when variable camber trim unit 100 is installed.

Referring generally to FIG. 1 and particularly to, e.g., FIGS. 3 and 4 for illustrative purposes only and not by way of limitation, variable camber trim unit 100 further comprises shaft spring 128, positioned within housing 124 and biasing shaft 118 toward the retracted position. The preceding portion of this paragraph characterizes example 4 of the subject matter, disclosed herein, wherein example 4 also encompasses example 3, above.

By biasing shaft 118 toward its retracted position that thus variable camber trim unit 100 toward its coupled configuration, the coupled configuration is the default configuration. That is, selective actuation of actuator 126 causes variable camber trim unit 100 to transition to the decoupled configuration, and when actuator 126 is not actuated, shaft spring 128 causes variable camber trim unit 100 to transition to the coupled configuration.

In one or more examples, shaft spring 128 comprises a stack of Belleville washers that bias shaft 118 toward actuator 126. In one or more examples, shaft spring 128 comprises a coil spring biased to an extended configuration, thereby biasing shaft 118 toward actuator 126.

Referring generally to FIG. 1 and particularly to, e.g., FIGS. 3 and 4 for illustrative purposes only and not by way of limitation, actuator 126 comprises cylinder 130 and actuator piston 132, positioned within cylinder 130 and operatively engaged with shaft 118. When cylinder 130 is pressurized, actuator piston 132 translates toward anchor interior splined surface 116 and causes shaft 118 to translate toward the extended position. The preceding portion of this paragraph characterizes example 5 of the subject matter, disclosed herein, wherein example 5 also encompasses example 3 or 4, above.

By being pressure-actuated, variable camber trim unit 100 is controllable by a hydraulic or pneumatic system, such as a hydraulic system of an aircraft.

Referring generally to FIG. 1 and particularly to, e.g., FIGS. 3 and 4 for illustrative purposes only and not by way of limitation, variable camber trim unit 100 further comprises pressure compensation chamber 166, Housing 124 comprises internal volume 170, within which shaft 118 is positioned. Pressure compensation chamber 166 is in fluidic communication with internal volume 170. When actuator piston 132 causes shaft 118 to translate toward the extended position, fluid from internal volume 170 flows into pressure compensation chamber 166. The preceding portion of this paragraph characterizes example 6 of the subject matter, disclosed herein, wherein example 6 also encompasses example 5, above.

Pressure compensation chamber 166 provides pressure relief within internal volume 170 when actuator piston 132 extends into internal volume 170. Accordingly, if a non-compressible fluid, such a lubricating fluid, is utilized within internal volume 170 for lubrication of the components of variable camber trim unit 100 within housing 124, a portion of the non-compressible fluid is displaced to pressure compensation chamber 166, thereby avoiding pressure spikes within housing 124 when variable camber trim unit 100 is in the decoupled configuration and thus maintaining integrity of any seals associated with housing 124.

Referring generally to FIG. 1 and particularly to, e.g., FIGS. 3 and 4 for illustrative purposes only and not by way of limitation, pressure compensation chamber 166 comprises chamber piston 172 and chamber spring 174, biasing chamber piston 172 toward internal volume 170. The preceding portion of this paragraph characterizes example 7 of the subject matter, disclosed herein, wherein example 7 also encompasses example 6, above.

Accordingly, when variable camber trim unit 100 transitions to the decoupled configuration, fluid from internal volume 170 of housing 124 pushes against chamber piston 172 against the bias of chamber spring 174. As a result, a constant volume of the fluid is maintained. When variable camber trim unit 100 transitions to the coupled configuration, chamber spring 174 pushes chamber piston 172 toward internal volume 170 of housing 124 and thus pushes the fluid back into internal volume 170, again maintaining a constant volume of the fluid and maintaining integrity of any seals associated with housing 124.

In one or more examples, chamber spring 174 is a coil spring, biased to an extended configuration, thereby biasing chamber piston 172 toward internal volume 170 of housing 124.

Referring generally to FIG. 1 and particularly to, e.g., FIGS. 3-6 for illustrative purposes only and not by way of limitation, anchor 134 comprises body 136 and anchor springs 138. Body 136 is coaxial with shaft 118 and comprises anchor interior splined surface 116. Anchor springs 138 are engaged between body 136 and housing 124 and rotationally bias body 136 toward a rotational default position. The preceding portion of this paragraph characterizes example 8 of the subject matter, disclosed herein, wherein example 8 also encompasses any one of examples 2 to 7, above.

By being rotationally spring-biased, body 136 of anchor 134 provides a range of rotational motion for shaft 118 and thus for output idler gear 106 and output gear 108 when variable camber trim unit 100 is in the decoupled configuration, which may be desirable in some applications for variable camber trim unit 100. For example, if a torque is applied to output gear 108 via a downstream structure, such as a flight-control surface of an aircraft, via output gear 108, output idler gear 106, and shaft 118, then anchor 134 will enable rotational play, or slop, by not rigidly fixing shaft 118 to housing 124.

Figure 6:
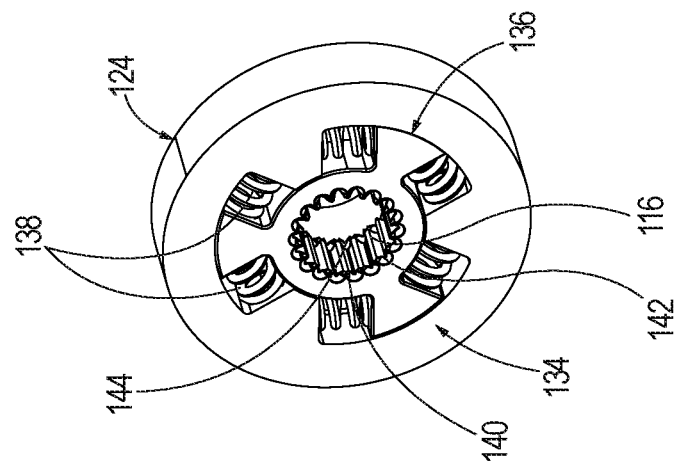
FIG. 6 is a schematic, isometric view of a portion of the variable camber trim unit of FIG. 1, according to one or more examples of the subject matter, disclosed herein.
Figure 5:
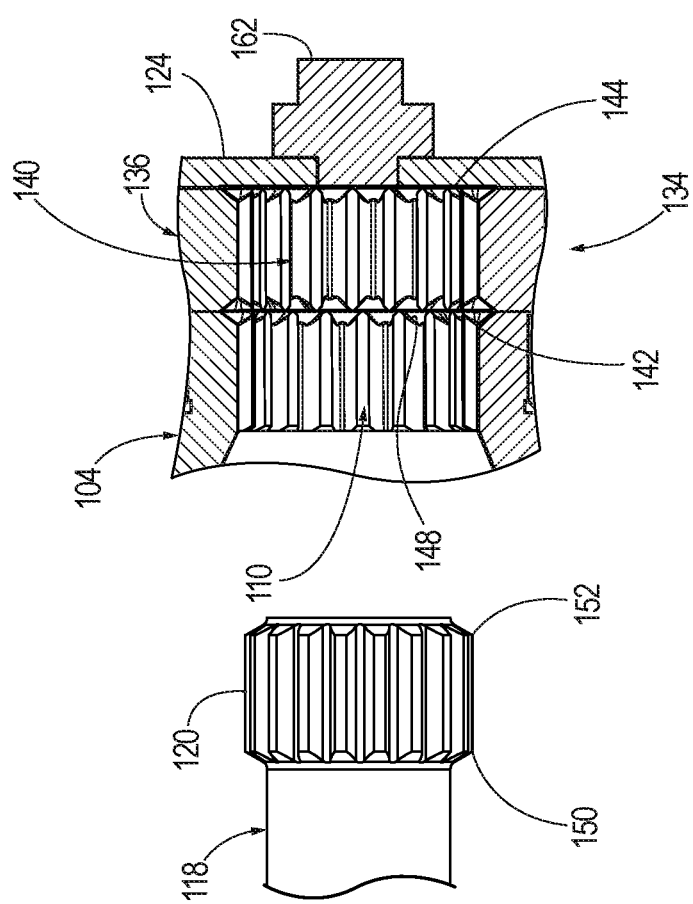
FIG. 5 is a schematic, fragmentary, partial cross-sectional, side view of a portion of the variable camber trim unit of FIG. 1, according to one or more examples of the subject matter, disclosed herein.

In one or more examples, as seen in FIG. 6, body 136 comprises one or more lobes, extending from a central hub and positioned within one or more corresponding pockets of housing 124. Anchor springs 138 are positioned on and engaged with opposing sides of a lobe of body 136 within the pockets of housing 124. In one more examples, anchor springs 138 are coil springs biased to an extended configuration, thereby by biasing a corresponding lobe of body 136 to a central position within a corresponding pocket of housing 124.

Referring generally to FIG. 1 and particularly to, e.g., FIGS. 3-6 for illustrative purposes only and not by way of limitation, anchor interior splined surface 116 comprises anchor-interior-splined-surface first end 142 and anchor-interior-splined-surface second end 144. Input idler gear 104 is closer to anchor-interior-splined-surface first end 142 than to anchor-interior-splined-surface second end 144. Splines of anchor interior splined surface 116 are tapered at anchor-interior-splined-surface first end 142. The preceding portion of this paragraph characterizes example 9 of the subject matter, disclosed herein, wherein example 9 also encompasses any one of examples 2 to 8, above.

Because the splines of anchor interior splined surface 116 are tapered at the first end, when variable camber trim unit 100 transitions to the decoupled configuration and shaft 118 translates toward anchor 134, anchor 134 will accommodate first exterior splined surface 120 initially being misaligned with anchor interior splined surface 116. That is, the ends of the splines at the first end of anchor interior splined surface 116 serve as ramps to force the splines of first exterior splined surface 120 into operative engagement with the splines of anchor interior splined surface 116 as shaft 118 translates toward and into engagement with anchor interior splined surface 116.

Referring generally to FIG. 1 and particularly to, e.g., FIGS. 3-6 for illustrative purposes only and not by way of limitation, each spline of input-idler-gear interior splined surface 110 comprises distal end 148, facing away from output idler gear 106. Distal end 148 is tapered. The preceding portion of this paragraph characterizes example 10 of the subject matter, disclosed herein, wherein example 10 also encompasses any one of examples 2 to 9, above.

Because the distal ends of the splines of input-idler-gear interior splined surface 110 are tapered, when variable camber trim unit 100 transitions to the coupled configuration and shaft 118 translates away from anchor interior splined surface 116, input idler gear 104 will accommodate first exterior splined surface 120 initially being misaligned with input-idler-gear interior splined surface 110. That is, the tapered distal ends of the splines of input-idler-gear interior splined surface 110 serve as ramps to force the spline of first exterior splined surface 120 into operative engagement with the splines of input-idler-gear interior splined surface 110 as shaft 118 translates away from anchor interior splined surface 116.

Referring generally to FIG. 1 and particularly to, e.g., FIGS. 3-6 for illustrative purposes only and not by way of limitation, each spline of first exterior splined surface 120 comprises first-exterior-spline first end 150 and first-exterior-spline second end 152, spaced apart from each other. First-exterior-spline first end 150 is tapered, and first-exterior-spline second end 152 is tapered. The preceding portion of this paragraph characterizes example 11 of the subject matter, disclosed herein, wherein example 11 also encompasses any one of examples 2 to 10, above.

Because the first ends of the splines of first exterior splined surface 120 are tapered, when variable camber trim unit 100 transitions to the coupled configuration and shaft 118 translates away from anchor interior splined surface 116, shaft 118 will accommodate first exterior splined surface 120 initially being misaligned with input-idler-gear interior splined surface 110. That is, the first ends of the splines of first exterior splined surface 120 serve as ramps to force the splines of first exterior splined surface 120 into operative engagement with the splines of input-idler-gear interior splined surface 110 as shaft 118 translates away from and out of engagement with anchor interior splined surface 116. Similarly, because the second ends of the splines of first exterior splined surface 120 are tapered, when variable camber trim unit 100 transitions to the decoupled configuration and thus shaft 118 translates toward anchor interior splined surface 116, the second ends of the splines of first exterior splined surface 120 serve as ramps to force the splines of first exterior splined surface 120 into operative engagement with the splines of anchor interior splined surface 116.

Referring generally to FIG. 1 and particularly to, e.g., FIGS. 3 and 4 for illustrative purposes only and not by way of limitation, input idler gear 104 further comprises axial bore 154. Shaft 118 extends through axial bore 154. Axial bore 154 comprises distal region 156, having a distal-region diameter, and proximal region 158, having a proximal-region diameter. Output idler gear 106 is closer to proximal region 158 than to distal region 156. Input-idler-gear interior splined surface 110 extends along only distal region 156 of axial bore 154. When variable camber trim unit 100 is in the decoupled configuration, second exterior splined surface 122 extends within proximal region 158 of axial bore 154. The preceding portion of this paragraph characterizes example 12 of the subject matter, disclosed herein, wherein example 12 also encompasses any one of examples 2 to 11, above.

Inclusion of proximal region 158 of axial bore 154 without input-idler-gear interior splined surface 110 enables input idler gear 104 and output idler gear 106 to be positioned in close proximity to each other within housing 124, thereby enabling variable camber trim unit 100 to be more compact.

Referring generally to FIG. 1 and particularly to, e.g., FIGS. 3 and 4 for illustrative purposes only and not by way of limitation, the proximal-region diameter is greater the second-exterior-splined-surface maximum diameter. The preceding portion of this paragraph characterizes example 13 of the subject matter, disclosed herein, wherein example 13 also encompasses example 12, above.

By being greater in diameter than the second-exterior-splined-surface maximum diameter, proximal region 158 creates a volume, within which second exterior splined surface 122 extends without an interference or friction between second exterior splined surface 122 and input idler gear 104 when variable camber trim unit 100 is in the decoupled configuration.

Referring generally to FIG. 1 and particularly to, e.g., FIGS. 3 and 4 for illustrative purposes only and not by way of limitation, the proximal-region diameter is greater than the distal-region diameter. The preceding portion of this paragraph characterizes example 14 of the subject matter, disclosed herein, wherein example 14 also encompasses example 12 or 13, above.

By having the proximal region greater in diameter than the distal-region diameter, in one or more examples, the maximum diameters of first exterior splined surface 120 and second exterior splined surface 122 of shaft 118 are the same, resulting in easier and lower-cost manufacture of shaft 118.

Referring generally to FIG. 1 and particularly to, e.g., FIGS. 3 and 4 for illustrative purposes only and not by way of limitation, the first-exterior-splined-surface maximum diameter is identical to the second-exterior-splined-surface maximum diameter. The preceding portion of this paragraph characterizes example 15 of the subject matter, disclosed herein, wherein example 15 also encompasses any one of examples 12 to 14, above.

Again, having the maximum diameters of first exterior splined surface 120 and second exterior splined surface 122 identical, shaft 118 is easier and less expensive to manufacture than otherwise.

Referring generally to FIG. 1 and particularly to, e.g., FIGS. 3 and 4 for illustrative purposes only and not by way of limitation, shaft 118 further comprises collar 160. When variable camber trim unit 100 is in the coupled configuration, collar 160 engages output idler gear 106. When variable camber trim unit 100 is in the decoupled configuration, collar 160 is positioned within proximal region 158. The preceding portion of this paragraph characterizes example 16 of the subject matter, disclosed herein, wherein example 16 also encompasses any one of examples 12 to 15, above.

Collar 160 acts as a structural stop to define the extent of translation of shaft 118 away from anchor interior splined surface 116. That is, engagement between collar 160 and output idler gear 106 at least in part defines the coupled configuration of variable camber trim unit 100. In one or more examples, actuator 126 therefore bears no force of shaft spring 128 when variable camber trim unit 100 is in the coupled configuration. In one or more examples, a gap is present between actuator piston 132 and shaft 118 when variable camber trim unit 100 is in the coupled configuration. Moreover, because collar 160 fits within proximal region 158 of axial bore 154 of input idler gear 104, variable camber trim unit 100 is compact.

Collar 160 additionally or alternatively is described as a flange that extends radially from shaft 118.

Referring generally to FIG. 1 and particularly to, e.g., FIG. 3 for illustrative purposes only and not by way of limitation, shaft 118 further comprises collar 160. When variable camber trim unit 100 is in the coupled configuration, collar 160 engages output idler gear 106. The preceding portion of this paragraph characterizes example 17 of the subject matter, disclosed herein, wherein example 17 also encompasses any one of examples 2 to 15, above.

Collar 160 acts as a structural stop to define the extent of translation of shaft 118 away from anchor interior splined surface 116. That is, engagement between collar 160 and output idler gear 106 at least in part defines the coupled configuration of variable camber trim unit 100.

Referring generally to FIG. 1 and particularly to, e.g., FIGS. 2-5 for illustrative purposes only and not by way of limitation, variable camber trim unit 100 further comprises distal proximity sensor 162, supported by housing 124 and configured to sense when shaft 118 is less than a threshold distance away from distal proximity sensor 162. When shaft 118 is less than the threshold distance away from distal proximity sensor 162, first exterior splined surface 120 is engaged with anchor interior splined surface 116 and is disengaged from input-idler-gear interior splined surface 110. The preceding portion of this paragraph characterizes example 18 of the subject matter, disclosed herein, wherein example 18 also encompasses any one of examples 2 to 17, above.

Distal proximity sensor 162 provides a signal that confirms when variable camber trim unit 100 is in the decoupled configuration, and thus distal proximity sensor 162 enables notification of a potential non-operational state of variable camber trim unit 100 such as if variable camber trim unit 100 is otherwise intended to be in the coupled configuration.

In one or more examples, distal proximity sensor 162 is an inductive proximity sensor or a magnetic proximity sensor.

Referring generally to FIG. 1 and particularly to, e.g., FIGS. 2-4 for illustrative purposes only and not by way of limitation, variable camber trim unit 100 further comprises proximal proximity sensor 164, supported by housing 124 and configured to sense when shaft 118 is less than a threshold distance away from proximal proximity sensor 164. When shaft 118 is less than the threshold distance away from proximal proximity sensor 164, first exterior splined surface 120 is disengaged from anchor interior splined surface 116 and is engaged with input-idler-gear interior splined surface 110. The preceding portion of this paragraph characterizes example 19 of the subject matter, disclosed herein, wherein example 19 also encompasses any one of examples 2 to 18, above.

Proximal proximity sensor 164 provides a signal that confirms when variable camber trim unit 100 is in the coupled configuration, and thus proximal proximity sensor 164 enables notification of a potential non-operational state of variable camber trim unit 100 such as if variable camber trim unit 100 is otherwise intended to be in the decoupled configuration.

In one or more examples, proximal proximity sensor 164 is an inductive proximity sensor or a magnetic proximity sensor.

Referring generally to FIG. 1 and particularly to, e.g., FIG. 2 for illustrative purposes only and not by way of limitation, variable camber trim unit 100 further comprises rotational position sensor 168, supported by housing 124 and configured to sense a rotational position of input gear 102 relative to housing 124. The preceding portion of this paragraph characterizes example 20 of the subject matter, disclosed herein, wherein example 20 also encompasses any one of examples 1 to 19, above.

Rotational position sensor 168 provides signal indicative of the rotational position of input gear 102 and thus also of upstream structure coupled to input gear 102, such as an inboard flight-control surface. Accordingly, the rotational position of the upstream structure is able to be monitored via merely sensing the rotational position of input gear 102, which is much less complex than directly sensing the rotational position of a large structure, such as a flight-control surface.

In one or more examples, rotational position sensor is a rotary encoder.

Referring generally to FIG. 7 and particularly to, e.g., FIGS. 3 and 4 for illustrative purposes only and not by way of limitation, method 200 of trimming flight-control surfaces comprises configuring variable camber trim unit 100 to the coupled configuration and configuring variable camber trim unit 100 to the decoupled configuration. The preceding portion of this paragraph characterizes example 21 of the subject matter, disclosed herein, wherein example 21 also encompasses any one of examples 1 to 20, above.

As discussed herein, by having a coupled configuration and a decoupled configuration, variable camber trim unit 100 provides for selective coupling and decoupling of rotational movement of structures coupled to input gear 102 and output gear 108. Moreover, not only is output gear 108 rotationally decoupled from input gear 102 when variable camber trim unit 100 is in the decoupled configuration, but also output gear 108 is capable of minimal rotation relative to housing 124, which is desirable in some configurations of flight-control surfaces with which variable camber trim unit 100 is used in some examples.

Referring generally to FIGS. 1 and 8 and particularly to, e.g., FIGS. 2-4 and 9 for illustrative purposes only and not by way of limitation, aircraft 300 comprises fuselage 306 and wing 308, supported by fuselage 306. Wing 308 comprises inboard flight-control surface 302, outboard flight-control surface 304, and variable camber trim unit 100. Inboard flight-control surface 302 and outboard flight-control surface 304 are movable relative to fuselage 306. Variable camber trim unit 100 is selectively configurable to one of a coupled configuration or a decoupled configuration. When variable camber trim unit 100 is in the coupled configuration, outboard flight-control surface 304 is coupled to inboard flight-control surface 302, such that when inboard flight-control surface 302 is moved relative to fuselage 306, outboard flight-control surface 304 also is moved relative to fuselage 306. When variable camber trim unit 100 is in the decoupled configuration, outboard flight-control surface 304 is decoupled from inboard flight-control surface 302, such that moving inboard flight-control surface 302 relative to fuselage 306 does not cause outboard flight-control surface 304 to move relative to fuselage 306. The preceding portion of this paragraph characterizes example 22 of the subject matter, disclosed herein.

By having a coupled configuration and a decoupled configuration, variable camber trim unit 100 provides for selective coupling and decoupling of inboard flight-control surface 302 and outboard flight-control surface 304.

Figure 9:
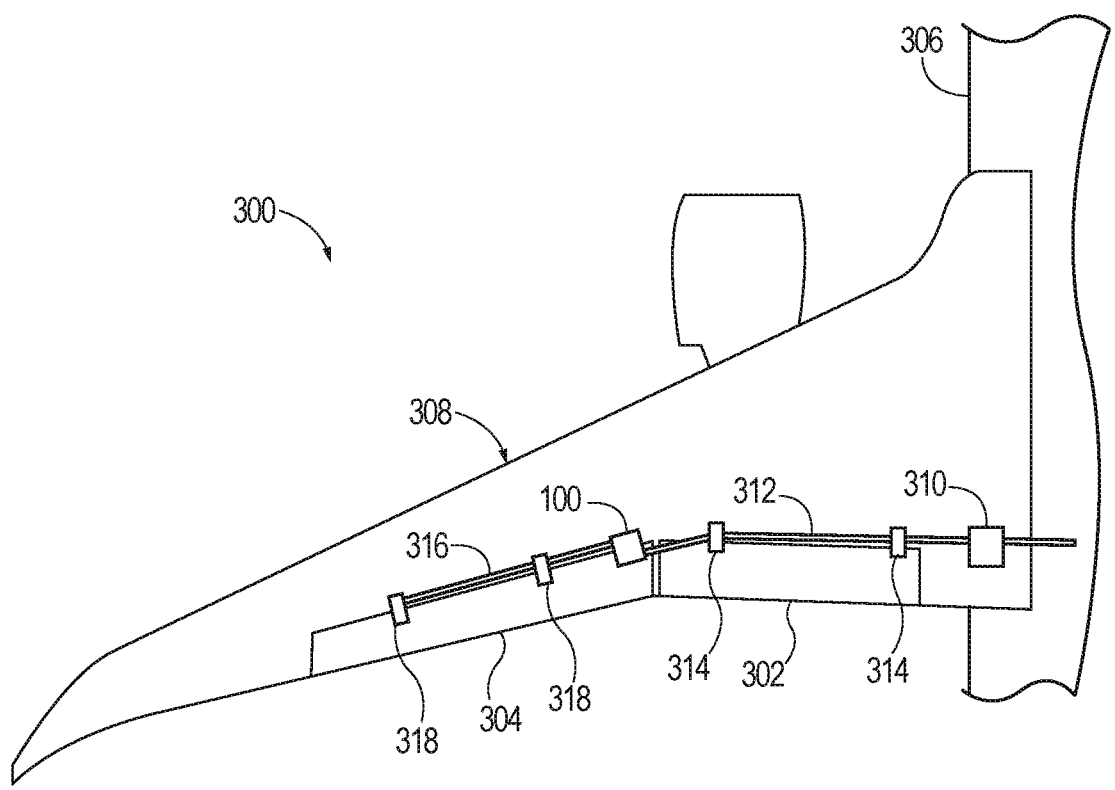
FIG. 9 is a schematic, fragmentary, plan view of the aircraft of FIG. 8, according to one or more examples of the subject matter, disclosed herein.

With reference to FIGS. 8 and 9, in one or more examples, wing 308 further comprises power drive unit 310, input shaft 312 coupled between power drive unit 310 and input gear 102 of variable camber trim unit 100, inboard linkages 314 interconnecting input shaft 312 and inboard flight-control surface 302, output shaft 316 coupled to output gear 108 of variable camber trim unit 100, and outboard linkages 318 interconnecting output shaft 316 to outboard flight-control surface 304. Accordingly, when variable camber trim unit 100 is in the coupled configuration, rotation of input shaft 312 by power drive unit 310 causes inboard flight-control surface 302 to be deployed and also, via variable camber trim unit 100 and output shaft 316, causes outboard flight-control surface 304 to be deployed. When variable camber trim unit 100 is in the decoupled configuration, rotation of input shaft 312 by power drive unit 310 only causes inboard flight-control surface 302 to be deployed.

In one or more examples, variable camber trim unit 100 is configured to be installed in aircraft 300 for operation of any suitable type of inboard and outboard flight-control surfaces, examples of which include flaps, stabilizers, elevators, rudders, spoilers, slats, ailerons, and flaperons.

Referring generally to FIGS. 1 and 8 and particularly to, e.g., FIGS. 3 and 4 for illustrative purposes only and not by way of limitation, in aircraft 300, variable camber trim unit 100 comprises housing 124, input gear 102, output gear 108, input idler gear 104, output idler gear 106, shaft 118, and anchor 134. Input gear 102 is rotatably supported by housing 124 and is coupled to inboard flight-control surface 302. Output gear 108 is rotatably supported by housing 124 and is coupled to outboard flight-control surface 304. Input idler gear 104 is rotatably supported by housing 124, is meshed with input gear 102, and comprises input-idler-gear interior splined surface 110. Output idler gear 106 is rotatably supported by housing 124, is coaxial with input idler gear 104, is meshed with output gear 108, and comprises output-idler-gear interior splined surface 112. Shaft 118 is translationally supported within housing 124, and is coaxial with input idler gear 104 and with output idler gear 106. Shaft 118 comprises first exterior splined surface 120, having a first-exterior-splined-surface maximum diameter, and second exterior splined surface 122, having a second-exterior-splined-surface maximum diameter. Anchor 134 is positioned within housing 124 and comprises anchor interior splined surface 116, which is coaxial with input idler gear 104 and with output idler gear 106. When variable camber trim unit 100 is in the coupled configuration, shaft 118 is positioned within housing 124, such that first exterior splined surface 120 of shaft 118 is engaged with input-idler-gear interior splined surface 110, first exterior splined surface 120 of shaft 118 is disengaged from anchor interior splined surface 116, second exterior splined surface 122 of shaft 118 is engaged with output-idler-gear interior splined surface 112, and rotation of input gear 102 relative to housing 124 causes rotation of output gear 108 relative to housing 124. When variable camber trim unit 100 is in the decoupled configuration, shaft 118 is positioned within housing 124, such that first exterior splined surface 120 of shaft 118 is disengaged from input-idler-gear interior splined surface 110, first exterior splined surface 120 of shaft 118 is engaged with anchor interior splined surface 116, second exterior splined surface 122 of shaft 118 is engaged with output-idler-gear interior splined surface 112 rotation of input gear 102 relative to housing 124 does not cause rotation of output gear 108 relative to housing 124, and output gear 108 is capable of at least 5° and no more than 15° of rotation relative to housing 124. The preceding portion of this paragraph characterizes example 23 of the subject matter, disclosed herein, wherein example 23 also encompasses example 22, above.

As discussed herein, input idler gear 104 and output idler gear 106 provide structure for transferring rotational input from input gear 102 to output gear 108, via shaft 118, when variable camber trim unit is in the coupled configuration. Shaft 118, via its exterior splines and their engagement with the interior splines of input idler gear 104, output idler gear 106, and anchor 134 and via its translation within housing 124 enables the coupled and decoupled configurations of variable camber trim unit 100.

Referring generally to FIGS. 1 and 8 and particularly to, e.g., FIGS. 2-4 for illustrative purposes only and not by way of limitation, in aircraft 300, variable camber trim unit 100 further comprises actuator 126, supported by housing 124. Actuator 126 is configured to selectively translate shaft 118 from a retracted position, in which first exterior splined surface 120 is disengaged from anchor interior splined surface 116, to an extended position, in which first exterior splined surface 120 is engaged with anchor interior splined surface 116. The preceding portion of this paragraph characterizes example 24 of the subject matter, disclosed herein, wherein example 24 also encompasses example 23, above.

As discussed, herein, by including actuator 126, variable camber trim unit 100 is controllable to transition variable camber trim unit 100 to its decoupled configuration when desired by a user or otherwise responsive to input from a control system, such as a flight control system.

Referring generally to FIGS. 1 and 8 and particularly to, e.g., FIGS. 3 and 4 for illustrative purposes only and not by way of limitation, in aircraft 300, variable camber trim unit 100 further comprises shaft spring 128, positioned within housing 124 and biasing shaft 118 toward the retracted position. The preceding portion of this paragraph characterizes example 25 of the subject matter, disclosed herein, wherein example 25 also encompasses example 24, above.

As discussed herein, by biasing shaft 118 toward its retracted position that thus variable camber trim unit 100 toward its coupled configuration, the coupled configuration is the default configuration. That is, selective actuation of actuator 126 causes variable camber trim unit 100 to transition to the decoupled configuration, and when actuator 126 is not actuated, shaft spring 128 causes variable camber trim unit 100 to transition to the coupled configuration.

Referring generally to FIGS. 1 and 8 and particularly to, e.g., FIGS. 3 and 4 for illustrative purposes only and not by way of limitation, in aircraft 300, actuator 126 comprises cylinder 130 and actuator piston 132, positioned within cylinder 130 and operatively engaged with shaft 118. When cylinder 130 is pressurized, actuator piston 132 translates toward anchor interior splined surface 116 and causes shaft 118 to translate toward the extended position. The preceding portion of this paragraph characterizes example 26 of the subject matter, disclosed herein, wherein example 26 also encompasses example 24 or 25, above.

As discussed herein, by being pressure-actuated, variable camber trim unit 100 is controllable by a hydraulic or pneumatic system, such as a hydraulic system of an aircraft.

Referring generally to FIGS. 1 and 8 and particularly to, e.g., FIGS. 3 and 4 for illustrative purposes only and not by way of limitation, in aircraft 300, variable camber trim unit 100 further comprises pressure compensation chamber 166. Housing 124 comprises internal volume 170, within which shaft 118 is positioned. Pressure compensation chamber 166 is in fluidic communication with internal volume 170. When actuator piston 132 causes shaft 118 to translate toward the extended position, fluid from internal volume 170 flows into pressure compensation chamber 166. The preceding portion of this paragraph characterizes example 27 of the subject matter, disclosed herein, wherein example 27 also encompasses example 26, above.

As discussed herein, pressure compensation chamber 166 provides pressure relief within internal volume 170 when actuator piston 132 extends into internal volume 170. Accordingly, if a non-compressible fluid, such a lubricating fluid, is utilized within internal volume 170 for lubrication of the components of variable camber trim unit 100 within housing 124, a portion of the non-compressible fluid is displaced to pressure compensation chamber 166, thereby avoiding pressure spikes within housing 124 when variable camber trim unit 100 is in the decoupled configuration and thus maintaining integrity of any seals associated with housing 124.

Referring generally to FIGS. 1 and 8 and particularly to, e.g., FIGS. 3 and 4 for illustrative purposes only and not by way of limitation, in aircraft 300, pressure compensation chamber 166 comprises chamber piston 172 and chamber spring 174, biasing chamber piston 172 toward internal volume 170. The preceding portion of this paragraph characterizes example 28 of the subject matter, disclosed herein, wherein example 28 also encompasses example 27, above.

As discussed herein, when variable camber trim unit 100 transitions to the decoupled configuration, fluid from internal volume 170 of housing 124 pushes against chamber piston 172 against the bias of chamber spring 174. As a result, a constant volume of the fluid is maintained. When variable camber trim unit 100 transitions to the coupled configuration, chamber spring 174 pushes chamber piston 172 toward internal volume 170 of housing 124 and thus pushes the fluid back into internal volume 170, again maintaining a constant volume of the fluid and maintaining integrity of any seals associated with housing 124.

Referring generally to FIGS. 1 and 8 and particularly to, e.g., FIGS. 3-6 for illustrative purposes only and not by way of limitation, in aircraft 300, anchor 134 comprises body 136 and anchor springs 138. Body 136 is coaxial with shaft 118 and comprises anchor interior splined surface 116. Anchor springs 138 are engaged between body 136 and housing 124 and rotationally bias body 136 toward a rotational default position. The preceding portion of this paragraph characterizes example 29 of the subject matter, disclosed herein, wherein example 29 also encompasses any one of examples 23 to 28, above.

As discussed herein, by being rotationally spring-biased, body 136 of anchor 134 provides a range of rotational motion for shaft 118 and thus for output idler gear 106 and output gear 108 when variable camber trim unit 100 is in the decoupled configuration, which may be desirable in some applications for variable camber trim unit 100. For example, if a torque is applied to output gear 108 via a downstream structure, such as a flight-control surface of an aircraft, via output gear 108, output idler gear 106, and shaft 118, then anchor 134 will enable rotational play, or slop, by not rigidly fixing shaft 118 to housing 124.

Referring generally to FIGS. 1 and 8 and particularly to, e.g., FIGS. 3-6 for illustrative purposes only and not by way of limitation, in aircraft 300, anchor interior splined surface 116 comprises anchor-interior-splined-surface first end 142 and anchor-interior-splined-surface second end 144. Input idler gear 104 is closer to anchor-interior-splined-surface first end 142 than to anchor-interior-splined-surface second end 144. Splines of anchor interior splined surface 116 are tapered at anchor-interior-splined-surface first end 142. The preceding portion of this paragraph characterizes example 30 of the subject matter, disclosed herein, wherein example 30 also encompasses any one of examples 23 to 29, above.

As discussed herein, because the splines of anchor interior splined surface 116 are tapered at the first end, when variable camber trim unit 100 transitions to the decoupled configuration and shaft 118 translates toward anchor 134, anchor 134 will accommodate first exterior splined surface 120 initially being misaligned with anchor interior splined surface 116. That is, the ends of the splines at the first end of anchor interior splined surface 116 serve as ramps to force the splines of first exterior splined surface 120 into operative engagement with the splines of anchor interior splined surface 116 as shaft 118 translates toward and into engagement with anchor interior splined surface 116.

Referring generally to FIGS. 1 and 8 and particularly to, e.g., FIGS. 3-6 for illustrative purposes only and not by way of limitation, in aircraft 300, each spline of input-idler-gear interior splined surface 110 comprises distal end 148, facing away from output idler gear 106. Distal end 148 is tapered. The preceding portion of this paragraph characterizes example 31 of the subject matter, disclosed herein, wherein example 31 also encompasses any one of examples 23 to 30, above.

As discussed herein, because the distal ends of the splines of input-idler-gear interior splined surface 110 are tapered, when variable camber trim unit 100 transitions to the coupled configuration and shaft 118 translates away from anchor interior splined surface 116, input idler gear y from 104 will accommodate first exterior splined surface 120 initially being misaligned with input-idler-gear interior splined surface 110. That is, the tapered distal ends of the splines of input-idler-gear interior splined surface 110 serve as ramps to force the spline of first exterior splined surface 120 into operative engagement with the splines of input-idler-gear interior splined surface 110 as shaft 118 translates away from anchor interior splined surface 116.

Referring generally to FIGS. 1 and 8 and particularly to, e.g., FIGS. 3-6 for illustrative purposes only and not by way of limitation, in aircraft 300, each spline of first exterior splined surface 120 comprises first-exterior-spline first end 150 and first-exterior-spline second end 152, spaced apart from each other. First-exterior-spline first end 150 is tapered, and first-exterior-spline second end 152 is tapered. The preceding portion of this paragraph characterizes example 32 of the subject matter, disclosed herein, wherein example 32 also encompasses any one of examples 23 to 31, above.

As discussed herein, because the first ends of the splines of first exterior splined surface 120 are tapered, when variable camber trim unit 100 transitions to the coupled configuration and shaft 118 translates away from anchor interior splined surface 116, shaft 118 will accommodate first exterior splined surface 120 initially being misaligned with input-idler-gear interior splined surface 110. That is, the first ends of the splines of first exterior splined surface 120 serve as ramps to force the splines of first exterior splined surface 120 into operative engagement with the splines of input-idler-gear interior splined surface 110 as shaft 118 translates away from and out of engagement with anchor interior splined surface 116. Similarly, because the second ends of the splines of first exterior splined surface 120 are tapered, when variable camber trim unit 100 transitions to the decoupled configuration and thus shaft 118 translates toward anchor interior splined surface 116, the second ends of the splines of first exterior splined surface 120 serve as ramps to force the splines of first exterior splined surface 120 into operative engagement with the splines of anchor interior splined surface 116.

Referring generally to FIGS. 1 and 8 and particularly to, e.g., FIGS. 3 and 4 for illustrative purposes only and not by way of limitation, in aircraft 300, input idler gear 104 further comprises axial bore 154. Shaft 118 extends through axial bore 154. Axial bore 154 comprises distal region 156, having a distal-region diameter, and proximal region 158, having a proximal-region diameter. Output idler gear 106 is closer to proximal region 158 than to distal region 156. Input-idler-gear interior splined surface 110 extends along only distal region 156 of axial bore 154. When variable camber trim unit 100 is in the decoupled configuration, second exterior splined surface 122 extends within proximal region 158 of axial bore 154. The preceding portion of this paragraph characterizes example 33 of the subject matter, disclosed herein, wherein example 33 also encompasses any one of examples 23 to 32, above.

As discussed herein, inclusion of proximal region 158 of axial bore 154 without input-idler-gear interior splined surface 110 enables input idler gear 104 and output idler gear 106 to be positioned in close proximity to each other within housing 124, thereby enabling variable camber trim unit 100 to be more compact.

Referring generally to FIGS. 1 and 8 and particularly to, e.g., FIGS. 3 and 4 for illustrative purposes only and not by way of limitation, in aircraft 300, proximal-region diameter is greater than second-exterior-splined-surface maximum diameter. The preceding portion of this paragraph characterizes example 34 of the subject matter, disclosed herein, wherein example 34 also encompasses example 33, above.

As discussed herein, by being greater in diameter than the second-exterior-splined-surface maximum diameter, proximal region 158 creates a volume, within which second exterior splined surface 122 extends without an interference or friction between second exterior splined surface 122 and input idler gear 104 when variable camber trim unit 100 is in the decoupled configuration.

Referring generally to FIGS. 1 and 8 and particularly to, e.g., FIGS. 3 and 4 for illustrative purposes only and not by way of limitation, in aircraft 300, the proximal-region diameter is greater than the distal-region diameter. The preceding portion of this paragraph characterizes example 35 of the subject matter, disclosed herein, wherein example 35 also encompasses example 33 or 34, above.

As discussed herein, by having the proximal region greater in diameter than the distal-region diameter, in one or more examples, the maximum diameters of first exterior splined surface 120 and second exterior splined surface 122 of shaft 118 are the same, resulting in easier and lower-cost manufacture of shaft 118.

Referring generally to FIGS. 1 and 8 and particularly to, e.g., FIGS. 3 and 4 for illustrative purposes only and not by way of limitation, in aircraft 300, the first-exterior-splined-surface maximum diameter is identical to the second-exterior-splined-surface maximum diameter. The preceding portion of this paragraph characterizes example 36 of the subject matter, disclosed herein, wherein example 36 also encompasses any one of examples 33 to 35, above.

As discussed herein, having the maximum diameters of first exterior splined surface 120 and second exterior splined surface 122 identical, shaft 118 is easier and less expensive to manufacture than otherwise.

Referring generally to FIGS. 1 and 8 and particularly to, e.g., FIGS. 3 and 4 for illustrative purposes only and not by way of limitation, in aircraft 300, shaft 118 further comprises collar 160. When variable camber trim unit 100 is in the coupled configuration, collar 160 engages output idler gear 106. When variable camber trim unit 100 is in the decoupled configuration, collar 160 is positioned within proximal region 158. The preceding portion of this paragraph characterizes example 37 of the subject matter, disclosed herein, wherein example 37 also encompasses any one of examples 33 to 36, above.

As discussed herein, collar 160 acts as a structural stop to define the extent of translation of shaft 118 away from anchor interior splined surface 116. That is, engagement between collar 160 and output idler gear 106 at least in part defines the coupled configuration of variable camber trim unit 100. In one or more examples, actuator 126 therefore bears no force of shaft spring 128 when variable camber trim unit 100 is in the coupled configuration. In one or more examples, a gap is present between actuator piston 132 and shaft 118 when variable camber trim unit 100 is in the coupled configuration. Moreover, because collar 160 fits within proximal region 158 of axial bore 154 of input idler gear 104, variable camber trim unit 100 is compact.

Referring generally to FIGS. 1 and 8 and particularly to, e.g., FIG. 3 for illustrative purposes only and not by way of limitation, in aircraft 300, shaft 118 further comprises collar 160. When variable camber trim unit 100 is in the coupled configuration, collar 160 engages output idler gear 106. The preceding portion of this paragraph characterizes example 38 of the subject matter, disclosed herein, wherein example 38 also encompasses any one of examples 23 to 36, above.

Again, collar 160 acts as a structural stop to define the extent of translation of shaft 118 away from anchor interior splined surface 116. That is, engagement between collar 160 and output idler gear 106 at least in part defines the coupled configuration of variable camber trim unit 100.

Referring generally to FIGS. 1 and 8 and particularly to, e.g., FIGS. 2-5 for illustrative purposes only and not by way of limitation, in aircraft 300, variable camber trim unit 100 further comprises distal proximity sensor 162, supported by housing 124 and configured to sense when shaft 118 is less than a threshold distance away from distal proximity sensor 162. When shaft 118 is less than the threshold distance away from distal proximity sensor 162, first exterior splined surface 120 is engaged with anchor interior splined surface 116 and is disengaged from input-idler-gear interior splined surface 110. The preceding portion of this paragraph characterizes example 39 of the subject matter, disclosed herein, wherein example 39 also encompasses any one of examples 23 to 38, above.

As discussed herein, distal proximity sensor 162 provides a signal that confirms when variable camber trim unit 100 is in the decoupled configuration, and thus distal proximity sensor 162 enables notification of a potential non-operational state of variable camber trim unit 100 such as if variable camber trim unit 100 is otherwise intended to be in the coupled configuration.

Referring generally to FIGS. 1 and 8 and particularly to, e.g., FIGS. 2-4 for illustrative purposes only and not by way of limitation, in aircraft 300, variable camber trim unit 100 further comprises proximal proximity sensor 164, supported by housing 124 and configured to sense when shaft 118 is less than a threshold distance away from proximal proximity sensor 164. When shaft 118 is less than the threshold distance away from proximal proximity sensor 164, first exterior splined surface 120 is disengaged from anchor interior splined surface 116 and is engaged with input-idler-gear interior splined surface 110. The preceding portion of this paragraph characterizes example 40 of the subject matter, disclosed herein, wherein example 40 also encompasses any one of examples 23 to 39, above.

As discussed herein, proximal proximity sensor 164 provides a signal that confirms when variable camber trim unit 100 is in the coupled configuration, and thus proximal proximity sensor 164 enables notification of a potential non-operational state of variable camber trim unit 100 such as if variable camber trim unit 100 is otherwise intended to be in the decoupled configuration.

Referring generally to FIGS. 1 and 8 and particularly to, e.g., FIG. 1 for illustrative purposes only and not by way of limitation, in aircraft 300, variable camber trim unit 100 further comprises rotational position sensor 168, supported by housing 124 and configured to sense a rotational position of input gear 102 relative to housing 124. The preceding portion of this paragraph characterizes example 41 of the subject matter, disclosed herein, wherein example 41 also encompasses any one of examples 23 to 40, above.

As discussed herein, rotational position sensor 168 provides signal indicative of the rotational position of input gear 102 and thus also of upstream structure coupled to input gear 102, such as an inboard flight-control surface. Accordingly, the rotational position of the upstream structure is able to be monitored via merely sensing the rotational position of input gear 102, which is much less complex than directly sensing the rotational position of a large structure, such as a flight-control surface.

Referring generally to FIG. 10 and particularly to, e.g., FIGS. 3 and 4 for illustrative purposes only and not by way of limitation, method 400 of operating aircraft 300 is disclosed. Method 400 comprises (block 402) configuring variable camber trim unit 100 of aircraft 300 to the coupled configuration and (block 404) configuring variable camber trim unit 100 to the decoupled configuration. The preceding portion of this paragraph characterizes example 42 of the subject matter, disclosed herein, wherein example 42 also encompasses any one of examples 22 to 41, above.

As discussed herein, by having a coupled configuration and a decoupled configuration, variable camber trim unit 100 provides for selective coupling and decoupling of inboard flight-control surface 302 and outboard flight-control surface 304.

Figure 12:
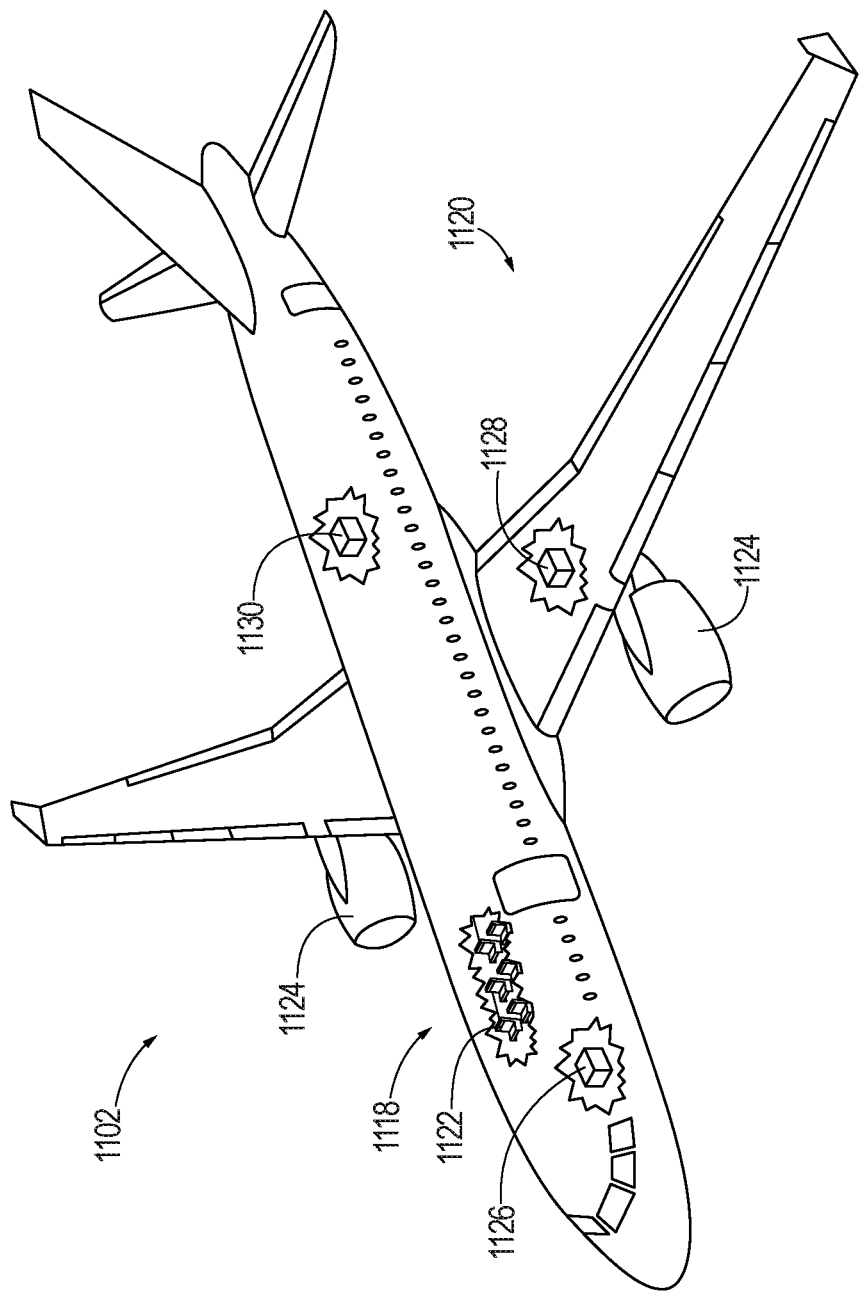
FIG. 12 is a schematic illustration of an aircraft.

Examples of the subject matter, disclosed herein may be described in the context of aircraft manufacturing and service method 1100 as shown in FIG. 11 and aircraft 1102 as shown in FIG. 12. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A variable camber trim unit, comprising:
a housing;
an input gear, rotatably supported by the housing; and
an output gear, rotatably supported by the housing;
wherein:
the variable camber trim unit is selectively configurable to one of a coupled configuration or a decoupled configuration;
when the variable camber trim unit is in the coupled configuration, rotation of the input gear relative to the housing causes rotation of the output gear relative to the housing; and
when the variable camber trim unit is in the decoupled configuration, rotation of the input gear relative to the housing does not cause rotation of the output gear relative to the housing, and the output gear is capable of at least 5° and no more than 15° of rotation relative to the housing.

2. The variable camber trim unit according to claim 1, further comprising:
an input idler gear, rotatably supported by the housing, meshed with the input gear, and comprising an input-idler-gear interior splined surface;
an output idler gear, rotatably supported by the housing, coaxial with the input idler gear, meshed with the output gear, and comprising an output-idler-gear interior splined surface;
a shaft, translationally supported within the housing, coaxial with the input idler gear and with the output idler gear, and comprising a first exterior splined surface, having a first-exterior-splined-surface maximum diameter, and a second exterior splined surface, having a second-exterior-splined-surface maximum diameter;

an anchor, positioned within the housing and comprising an anchor interior splined surface, coaxial with the input idler gear and with the output idler gear;

wherein:

when the variable camber trim unit is in the coupled configuration, the shaft is positioned within the housing, such that:

the first exterior splined surface of the shaft is engaged with the input-idler-gear interior splined surface;

the first exterior splined surface of the shaft is disengaged from the anchor interior splined surface; and the second exterior splined surface of the shaft is engaged with the output-idler-gear interior splined surface; and when the variable camber trim unit is in the decoupled configuration, the shaft is positioned within the housing, such that:

the first exterior splined surface of the shaft is disengaged from the input-idler-gear interior splined surface;

the first exterior splined surface of the shaft is engaged with the anchor interior splined surface; and the second exterior splined surface of the shaft is engaged with the output-idler-gear interior splined surface.

3. The variable camber trim unit according to claim 2, further comprising an actuator, supported by the housing and configured to selectively translate the shaft from a retracted position, in which the first exterior splined surface is disengaged from the anchor interior splined surface, to an extended position, in which the first exterior splined surface is engaged with the anchor interior splined surface.

4. The variable camber trim unit according to claim 3, further comprising a shaft spring, positioned within the housing and biasing the shaft toward the retracted position.

5. The variable camber trim unit according to claim 3, wherein:

the actuator comprises a cylinder and an actuator piston, positioned within the cylinder and operatively engaged with the shaft; and when the cylinder is pressurized, the actuator piston translates toward the anchor interior splined surface and causes the shaft to translate toward the extended position.

6. The variable camber trim unit according to claim 5, further comprising a pressure compensation chamber;

wherein:

the housing comprises an internal volume, within which the shaft is positioned;

the pressure compensation chamber is in fluidic communication with the internal volume; and when the actuator piston causes the shaft to translate toward the extended position, fluid from the internal volume flows into the pressure compensation chamber.

7. The variable camber trim unit according to claim 6, wherein the pressure compensation chamber comprises a chamber piston and a chamber spring, biasing the chamber piston toward the internal volume.

8. The variable camber trim unit according to claim 2, wherein the anchor comprises:

a body, coaxial with the shaft and comprising the anchor interior splined surface; and anchor springs, engaged between the body and the housing and rotationally biasing the body toward a rotational default position.

9. The variable camber trim unit according to claim 2, wherein:

the anchor interior splined surface comprises an anchor-interior-splined-surface first end and an anchor-interior-splined-surface second end;

the input idler gear is closer to the anchor-interior-splined-surface first end than to the anchor-interior-splined-surface second end; and splines of the anchor interior splined surface are tapered at the anchor-interior-splined-surface first end.

10. The variable camber trim unit according to claim 2, wherein:

each spline of the input-idler-gear interior splined surface comprises a distal end, facing away from the output idler gear; and the distal end is tapered.

11. The variable camber trim unit according to claim 2, wherein:

each spline of the first exterior splined surface comprises a first-exterior-spline first end and a first-exterior-spline second end, spaced apart from each other;

the first-exterior-spline first end is tapered; and the first-exterior-spline second end is tapered.

12. The variable camber trim unit according to claim 2, wherein:

the input idler gear further comprises an axial bore;

the shaft extends through the axial bore;

the axial bore comprises a distal region, having a distal-region diameter, and a proximal region, having a proximal-region diameter;

the output idler gear is closer to the proximal region than to the distal region;

the input-idler-gear interior splined surface extends along only the distal region of the axial bore; and when the variable camber trim unit is in the decoupled configuration, the second exterior splined surface extends within the proximal region of the axial bore.

13. The variable camber trim unit according to claim 12, wherein the proximal-region diameter is greater than the second-exterior-splined-surface maximum diameter.

14. The variable camber trim unit according to claim 12, wherein the proximal-region diameter is greater than the distal-region diameter.

15. The variable camber trim unit according to claim 12, wherein the first-exterior-splined-surface maximum diameter is identical to the second-exterior-splined-surface maximum diameter.

16. The variable camber trim unit according to claim 12, wherein:

the shaft further comprises a collar;

when the variable camber trim unit is in the coupled configuration, the collar engages the output idler gear; and when the variable camber trim unit is in the decoupled configuration, the collar is positioned within the proximal region.

17. The variable camber trim unit according to claim 2, wherein:

the shaft further comprises a collar; and when the variable camber trim unit is in the coupled configuration, the collar engages the output idler gear.

18. The variable camber trim unit according to claim 2, further comprising a distal proximity sensor, supported by the housing and configured to sense when the shaft is less than a threshold distance away from the distal proximity sensor, wherein, when the shaft is less than the threshold distance away from the distal proximity sensor, the first exterior splined surface is engaged with the anchor interior splined surface and is disengaged from the input-idler-gear interior splined surface.

19. The variable camber trim unit according to claim 2, further comprising a proximal proximity sensor, supported by the housing and configured to sense when the shaft is less than a threshold distance away from the proximal proximity sensor, wherein, when the shaft is less than the threshold distance away from the proximal proximity sensor, the first exterior splined surface is disengaged from the anchor interior splined surface and is engaged with the input-idler-gear interior splined surface.

20. A method of trimming flight-control surfaces, the method comprising configuring the variable camber trim unit according to claim 1 to the coupled configuration and configuring the variable camber trim unit to the decoupled configuration.

21. An aircraft, comprising:
a fuselage; and
a wing, supported by the fuselage and comprising:
   an inboard flight-control surface, movable relative to the fuselage;
   an outboard flight-control surface, movable relative to the fuselage; and
   the variable camber trim unit according to claim 1;
wherein:
   when the variable camber trim unit is in the coupled configuration, the outboard flight-control surface is coupled to the inboard flight-control surface, such that when the inboard flight-control surface is moved relative to the fuselage, the outboard flight-control surface also is moved relative to the fuselage; and
   when the variable camber trim unit is in the decoupled configuration, the outboard flight-control surface is decoupled from the inboard flight-control surface, such that moving the inboard flight-control surface relative to the fuselage does not cause the outboard flight-control surface to move relative to the fuselage.

\* \* \* \* \*